United States Patent [19]
Parr

[11] Patent Number: 5,927,678
[45] Date of Patent: Jul. 27, 1999

[54] COMPLIANT MOUNTING SYSTEM FOR AUTOMOTIVE COMPONENTS

[75] Inventor: Jonathan Craig Parr, Whoberley, United Kingdom

[73] Assignee: Jaguar Cars Limited, United Kingdom

[21] Appl. No.: 08/695,046

[22] Filed: Aug. 9, 1996

[51] Int. Cl.⁶ .................................................. F16M 13/00
[52] U.S. Cl. .................. 248/559; 74/89.1; 74/573 R; 248/562; 248/638
[58] Field of Search .................... 248/559, 562, 248/566, 636, 638; 188/378; 267/136; 74/89.1, 83, 84 R, 573 R

[56] References Cited

U.S. PATENT DOCUMENTS

| | | |
|---|---|---|
| 2,484,241 | 10/1949 | Mulheim . |
| 3,322,379 | 5/1967 | Flannelly ................................ 248/559 |
| 4,223,565 | 9/1980 | Sugiyama et al. . |
| 4,420,134 | 12/1983 | Flannelly ............................ 248/638 X |
| 4,679,761 | 7/1987 | Small . |
| 4,766,984 | 8/1988 | Gaffey et al. ........................ 248/559 X |
| 5,433,422 | 7/1995 | Ross et al. . |

FOREIGN PATENT DOCUMENTS

| | | |
|---|---|---|
| 0183197 A2 | 11/1985 | European Pat. Off. . |
| 4431772A1 | 3/1996 | Germany . |
| 1439326 | 11/1988 | U.S.S.R. ................................. 248/562 |

OTHER PUBLICATIONS

Database WPI, week 8317, Jun. 6, 1983, Derwent Publications, London, p. 1, AN 83–F7461K, XP002017442, & SU 937 820 a (Komm Mine Metal Ins), 23.

Primary Examiner—Derek J. Berger
Attorney, Agent, or Firm—Jerome R. Drouillard

[57] ABSTRACT

A mounting system for securing a first component compliantly with respect to a second component has a flywheel mounted rigidly with respect to one of the components and compliantly with respect to the other component for rotation in a plane normal to the direction of movement of the first component towards the second component. One or more spring elements acting between the other component and the flywheel drive the flywheel upon movement of the first component towards the second component.

3 Claims, 3 Drawing Sheets

COMPLIANT MOUNTING SYSTEM FOR AUTOMOTIVE COMPONENTS

BACKGROUND OF THE INVENTION

1. Field of the Invention

The present invention relates to a mounting system and in particular but not exclusively to a counting system for motor vehicle engines/gearboxes.

2. Description of the Prior Art

Currently, vehicle engines/gearboxes are mounted to motor vehicles by means of compliant mounts which isolate engine/gearbox vibrations from the vehicle body. In a simplified form, the engine/gearbox mount may comprise a single coil spring. Such mounts suffer however from lack of inherent damping and poor lateral control. Rubber mounts provide an inexpensive form of mount which can be designed to provide appropriate damping and to give good lateral support. However, the effectiveness of the rubber mount is limited by the need to compromise between low frequency stiffness which improves vibration isolation while the engine is idling, and higher frequency stiffness which improves vibration isolation at high engine and vehicle speeds, and which improves the constraint of the engine/gearbox.

Low frequency vibration isolation of the mount may be improved by means of harmonic damping effects produced by the use of two spring elements with a mass located therebetween. With such a system, the low frequency vibration of the engine/gearbox is damped by the vibrations of the mass acting between the spring elements. In order for this to work properly, the natural frequency of the mass must be outside the natural body frequency of the vehicle body and the engine order frequencies. If this is not achieved, the system will amplify those inputs which coincide with the natural frequency of the mount. In order to ensure that this is avoided, the natural frequency of the mount needs to be 30 Hz or lower. This frequency can only be achieved by using springs with a low spring rate and by using a large mass. This is not desirable since low spring rates reduce low frequency vibration control and also the large mass is undesirable since minimising the mass of the motor vehicle improves fuel economy and reduces costs. Furthermore, harmonic damping mounts of this form are of inherently complex design and expensive to produce.

Low frequency isolation of the engine/gearbox can be improved by the use of a hydraulic mount known as a hydramount in which, fluid is pushed through a long tube between a pair of chambers. With this system, if the vibration is of high frequency, the fluid has sufficient inertia to resist movement, resulting in the vibration being isolated solely by the flexibility of a rubber diaphragm by which the engine/gearbox is connected to the hydraulic circuit. During low frequency vibration fluid passes more freely between the chambers resulting in the rubber diaphragm being effectively more flexible. Hydromounts of this form are of complex design and are expensive components. Furthermore, due to the hydraulic nature of its operation, a degree of damping is unavoidable as fluid is forced from the chambers into the smaller diameter connecting tube. Moreover, hydraulic mounts do not generally resist large fore-aft movements as they have little inherent strength in these directions.

SUMMARY OF THE INVENTION

The present invention provides a mount with good low frequency isolation characteristics, which has fully tunable fore-aft and lateral spring rates and fully tunable damping characteristics allowing less damping than is possible with a hydramount. The mount is also of relatively simple construction, compact, and of low cost.

According to one aspect of the present invention, a mounting system for securing a first component compliantly with respect to a second component comprises: a flywheel adapted to be mounted with respect to one of said components for rotation in a plane normal to the direction of movement of said first component towards the second component, and means for driving the flywheel upon movement of the first component towards and away from the second component, with the other of said components being compliantly connected to the flywheel and/or drive means.

According to a preferred embodiment of the invention, the other of said components is connected to the flywheel by one or more spring elements, with each spring element being attached at one end to said other component and at the other end to the flywheel, and with the spring elements being inclined relative to the plane of rotation of the flywheel, so that movement of the first component normal to the plane of rotation of the flywheel will cause the flywheel to rotate.

With the mounting system disclosed above, when the first component vibrates at low frequency relative to said second component, the flywheel undergoes rotational oscillation at or slightly below its natural frequency of rotation. This causes the system to attempt to reduce the force supporting the engine/gearbox as the engine/gearbox attempts to move towards the body, thereby reducing the transmission of the increased force to the body. Similarly, as the engine/gearbox moves away from the body, rotation of the flywheel attempts to increase the force supporting the engine/gearbox, with similar effect.

The natural frequency of oscillation of the flywheel may be altered by altering the mass of the flywheel, the leverage exerted on the flywheel by the spring element, the diameter about which the spring element will act on the flywheel, the diameter about which the effective mass of the flywheel is situated and/or the spring rate of the spring elements. It is consequently possible to obtain a system of the desired natural frequency, without the use of undesirably large masses or spring elements of undesirably low spring rate.

The preferred embodiment has only a bearing and additional metal (in the flywheel) in addition to the components of a standard engine/gearbox mount and consequently results in only a small increase in cost over the standard engine/gearbox mount. Furthermore, the design can easily be tuned to provide varying individual fore-aft and lateral rates.

BRIEF DESCRIPTION OF THE DRAWINGS

The invention is now described, by way of example only, with reference to the accompanying drawings, in which.

DESCRIPTION OF THE PREFERRED EMBODIMENTS

Figure 1:
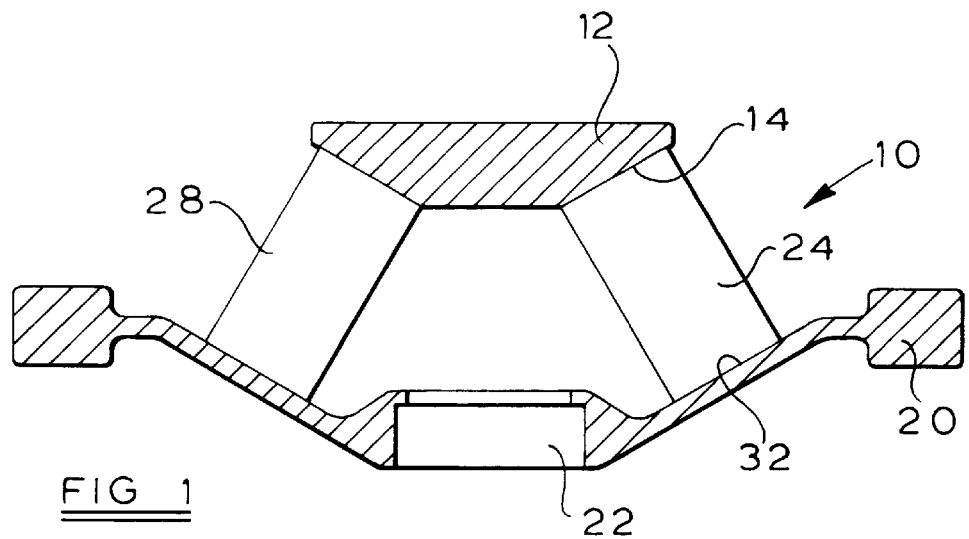
FIG. 1 illustrates in cross-section a mounting system in accordance with the present invention.
Figure 2:
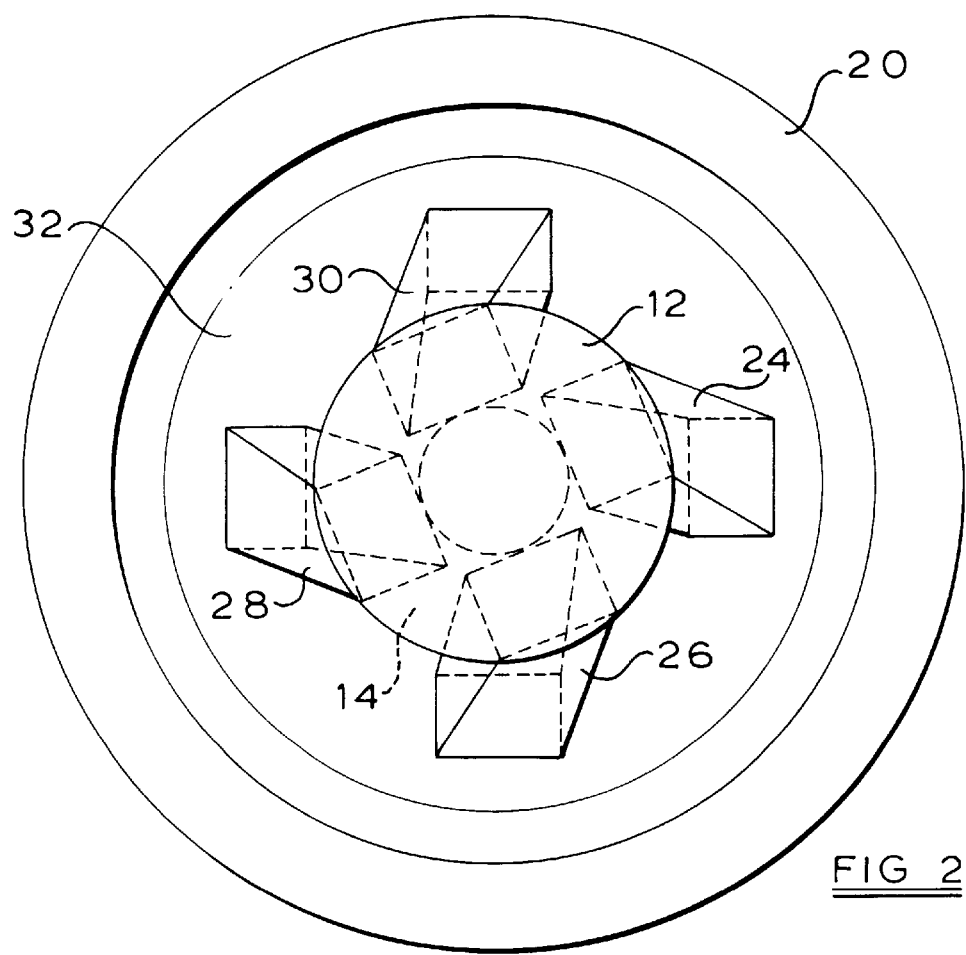
FIG. 2 illustrates in plan view the mounting system illustrated in FIG. 1.
Figure 3A:
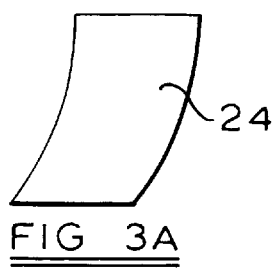
FIG. 3A and 4A show modifications to the spring elements us d in the mounting system illustrated in FIG. 1.
Figure 3B:
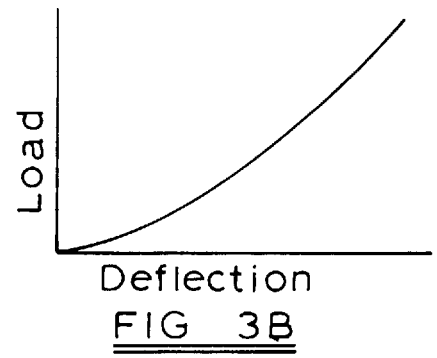
FIGS. 3B and 4B show plots of load against deflection for the spring elements illustrated in FIGS. 3A and 4A respectively.
Figure 4A:
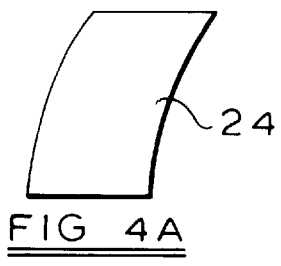
Figure 4B:
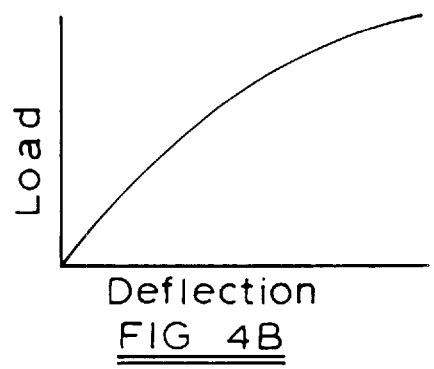

As illustrated in FIGS. 1 and 2, a mounting system 10 for a gearbox of a motor vehicle comprises a mounting plate 12 of frustoconical configuration. Means (not shown), for example, one or more studs, are provided on the mounting plate 12 by which it may be secured to the gearbox of the vehicle, with conical surface 14 extending downwardly.

Flywheel 20 is rotatably mounted coaxially of the mounting plate 12 to the vehicle body or a sub-frame attached to the vehicle body. The flywheel 20 has a roller bearing formation, 22 which is mounted on a stub axle secured to the vehicle body or sub-frame.

Elastomeric blocks 24, 26, 28, 30 are mounted between conical surface 14 of mounting plate 12 and a parallel opposed surface 32 of flywheel 20. Blocks 24, 26, 28, 30 are inclined outwardly from mounting plate 12 to flywheel 20. Blocks 24, 26, 28, 30 are also inclined with respect to flywheel 20, so that the positions at which blocks 24, 26, 28, 30 are secured to flywheel 20 are advanced angularly in a clockwise direction from the positions at which blocks 24, 26, 28, 30 are secured to mounting plate 12.

As a consequence of the tangential inclination of blocks 24, 26, 28, 30 with respect to flywheel 20, vertical downward movement of plate 12 compressing blocks 24, 26, 28, 30 will be translated into a load which will cause flywheel 20 to rotate in a clockwise direction. Vertical upward movement of mounting plate 12, putting blocks 24, 26, 28, 30 into tension, will be translated into a load causing flywheel 20 to rotate in an anti-clockwise direction.

When the gearbox vibrates at low frequency relative to the body of the vehicle, the vertical movement of the gearbox will thereby cause the flywheel 20 to undergo rotational oscillation at or slightly below its natural frequency of rotation. This causes the system to attempt to reduce the force supporting the gearbox as the gearbox attempts to move towards the body, thereby reducing the transmission of the increased force to the body. Similarly, as the gearbox moves away from the body the rotation of the flywheel 20 attempts to increase the force supporting the gearbox, with similar effect. For low frequency vibrations, the rotation of the flywheel 20 will thereby effectively reduce the stiffness of elastomeric blocks 24, 26, 28, 30.

For higher frequency vibrations, the inertia of flywheel 20 will inhibit rotation so that the stiffness of mounting system 10 will correspond to the stiffness of blocks 24, 26, 28, 30.

Inclination of blocks 24, 26, 28, 30 outwardly from mounting block 12 to flywheel 20 will also provide fore/aft and lateral restraint of the gearbox relative to the vehicle body.

In the mounting system illustrated in FIGS. 1 and 2, the natural frequency of oscillation of the flywheel may be increased or decreased by increasing or decreasing the radius at which blocks 24, 26, 28, 30 are secured to flywheel 20.

With the elastomeric blocks 24, 26, 28, 30 illustrated in FIGS. 1 and 2, the spring rates of the blocks 24, 26, 28, 30 will remain constant over the full range of operation of the mount. As illustrated in FIGS. 3A–B and 4A–B, the blocks 24, 26, 28, 30 may be designed to provide a varying spring rate over the range of operation of the mount.

Figure 5:
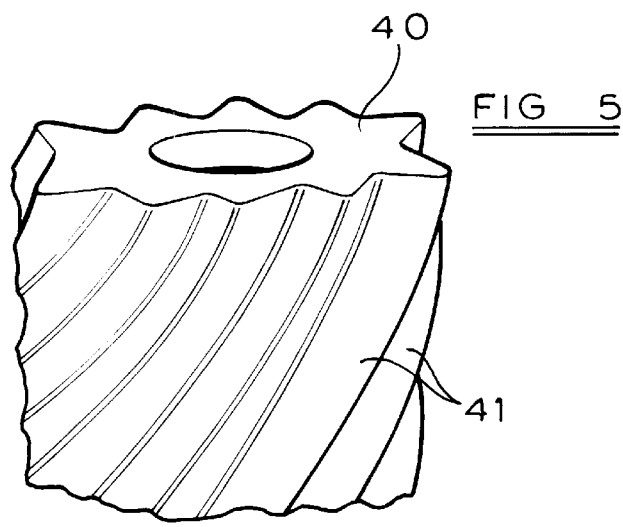
FIGS. 5 and 6 illustrate composite spring elements that may replace the spring elements of the mounting system illustrated in FIG. 1.
Figure 6:
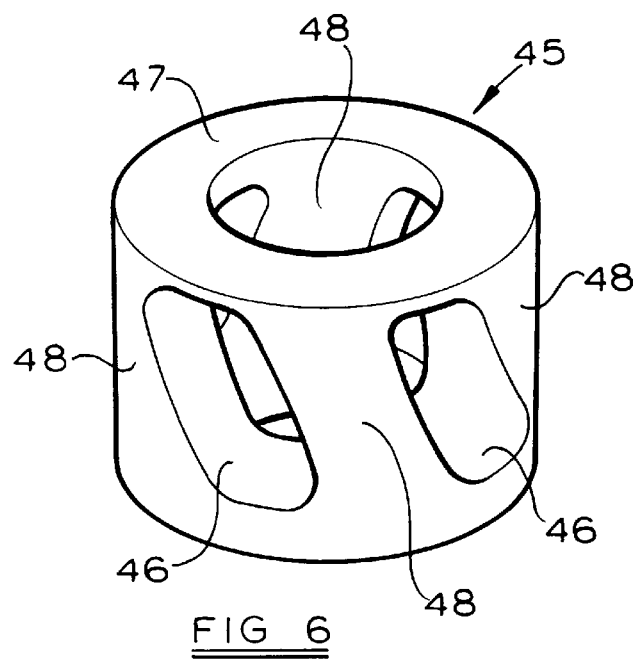

As illustrated by FIGS. 5 and 6, the individual elastomeric blocks 24, 26, 28, 30 of the mounting system 10 illustrated in FIGS. 1 and 2 may be replaced by single elastomeric molded elements 40, 45. In the embodiment illustrated in FIG. 5, helical formations 41 are provided externally of a hollow, cylindrical elastomeric block 40 to translate axial loads into tangential loads. In the embodiment illustrated in FIG. 6, inclined portions 46 of a hollow, cylindrical elastomeric block 47 are removed to leave helically inclined spokes 48 which will translate axial loads into tangential loads, in similar manner to blocks 24, 26, 28, 30 of the mounting system illustrated in FIGS. 1 and 2.

Figure 7:
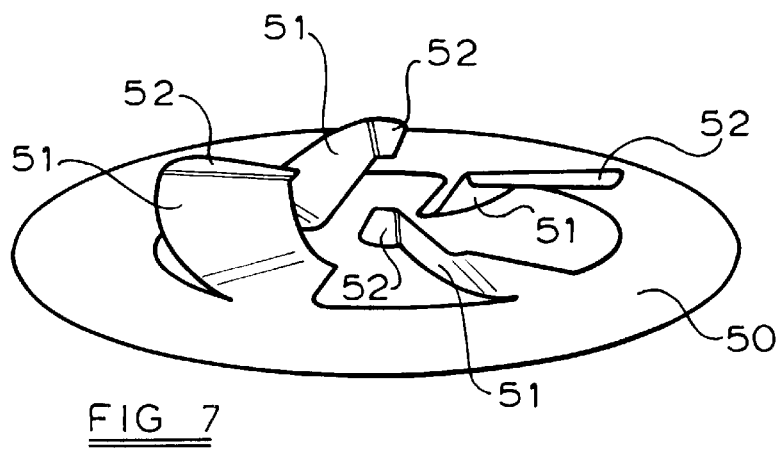
FIG. 7, illustrates an alternative form of spring element that may be used in the mounting system illustrated in FIG. 1.

While it is convenient to use elastomeric spring elements which may be bonded between opposed surfaces of the mounting plate 12 and flywheel 20, other forms of spring elements may be used. For example, as illustrated in FIG. 7, a steel diaphragm spring 50 may be used, with the diaphragm spring 50 having circumferentially resiliently extending fingers 51 which are pressed out of the plane of the diaphragm 50, to provide the spring elements which extend between the mounting plate 12 and flywheel 20. Diaphragm 50 may be secured to either mounting plate 12 or to flywheel 20, with the free ends 52 of the fingers 51 secured to the other of flywheel 20 or mounting plate 12 in suitable manner.

Figure 8:
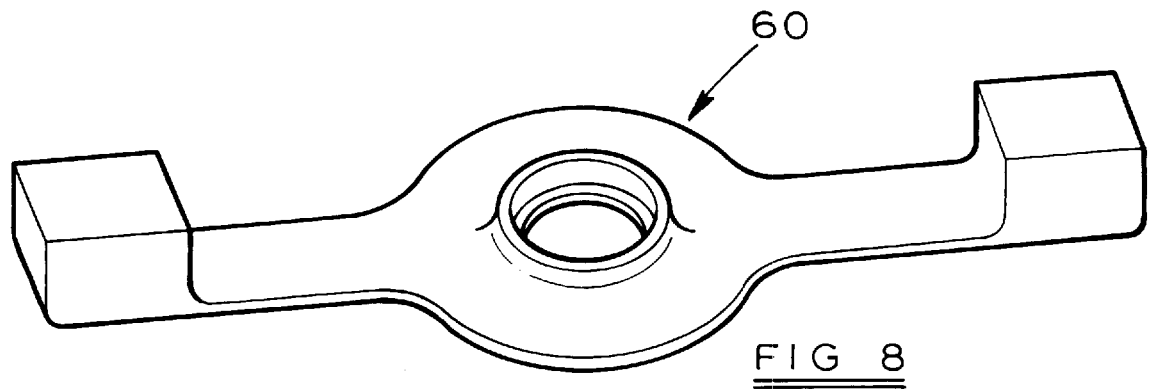
FIG. 8 illustrates an alternative form of flywheel that may be used in the mounting system illustrated in FIG. 1.

As illustrated in FIG. 8, flywheel 60 need not be circular, provided that it is of symmetrical configuration. Flywheel 60 may consequently be designed to conform with limited angular articulation and packaging constraints. The bearing for the flywheel may be provided on the flywheel itself and a stub axle secured to the vehicle body or sub-frame, or the bearing may be provided on the vehicle body or sub-frame and an axle formation provided on the flywheel. The bearing may be a simple roller bearing with means to prevent axial movement. Alternatively, provision may be made for restrained axial movement of the flywheel, such movement being resisted at a sufficiently high rate, so that the natural frequency of axial vibration of the flywheel will be above any vehicle body or engine/gearbox resonances. Rotational resistance or damping may also be introduced into the bearing in order to further fine tune the mount.

Further resilient elements, for example, elastomeric blocks, may be provided between the mounting plate 12 and flywheel 20 or between the mounting plate 12 and/or flywheel 20 and the vehicle body or sub-frame, to act as dampers, buffers or snubbers, in order to modify the damping effect, lateral, fore/aft and/or vertical compliance of the mounting.

Various modifications may be made without departing from the present invention. For example, while in the above embodiments the flywheel is driven by spring elements other drive means which will redirect the movement of the gearbox into the flywheel may be used. Such drive means include:

i) a hydraulic or pneumatic coupling between the vertical movement of the gearbox and the rotational movement of the flywheel;

ii) a screw drive in which the gearbox is attached to a shaft with a helical screw which is then located in splines in the centre of the flywheel thus causing the flywheel to rotate as the screw is moved up and down; or iii) a lever mechanism where a bent lever which is mounted on a pivot is actuated vertically by the movement of the gearbox and which then reacts the force horizontally against the flywheel.

Furthermore, while in the above embodiment the flywheel is rotatably mounted to the vehicle body or a sub-frame and connected to the gearbox by the spring elements, the flywheel may alternatively be rotatably connected to the gearbox and compliantly connected to the vehicle body or sub-frame.

I claim:

1. A mounting system for securing a first automotive component compliantly with respect to a second automotive component, with said mounting system comprising:

a flywheel adapted for mounting to the first component for rotation about a rotational axis; and drive means connected with the flywheel for rotatably driving the flywheel in response to axial movement of the first component toward and away from the second component along the rotational axis, with said drive means comprising a plurality of elastomeric elements being secured at one end to the flywheel and at a second end to the second component, with each of said elastomeric elements being inclined relative to the plane of rotation of the flywheel so that movement of the first component normal to the plane of rotation of the flywheel will cause the flywheel to rotate.

2. A mounting system according to claim 1, in which a mounting plate is provided for attachment to said element, said mounting plate defining a frustoconical surface adapted to be secured to the second component, the flywheel being mounted coaxially with the frustoconical surface of the mounting plate, with the flywheel having a frustoconical surface opposed and parallel to the frustoconical surface of the mounting plate, and with the spring elements being mounted between the frustoconical surfaces of the mounting plate and the flywheel.

3. A mounting system according to claim 1 in which said plurality of elastomeric elements is arranged symmetrically about the rotational axis of the flywheel.

* * * * *